US012627362B2

(12) United States Patent
Koskela et al.

(10) Patent No.: US 12,627,362 B2
(45) Date of Patent: May 12, 2026

(54) APPARATUS AND METHOD FOR INTER-CELL BEAM MANAGEMENT

(71) Applicant: Nokia Technologies Oy, Espoo (FI)

(72) Inventors: Timo Koskela, Oulu (FI); Sami-Jukka Hakola, Oulu (FI); Keeth Saliya Jayasinghe Laddu, Espoo (FI); Juha Pekka Karjalainen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/722,904

(22) PCT Filed: Dec. 23, 2022

(86) PCT No.: PCT/EP2022/087753
§ 371 (c)(1),
(2) Date: Jun. 21, 2024

(87) PCT Pub. No.: WO2023/131558
PCT Pub. Date: Jul. 13, 2023

(65) Prior Publication Data
US 2025/0080200 A1 Mar. 6, 2025

(30) Foreign Application Priority Data
Jan. 5, 2022 (FI) ..................................... 20225006

(51) Int. Cl.
H04L 1/02 (2006.01)
H04B 7/06 (2006.01)
H04L 5/00 (2006.01)

(52) U.S. Cl.
CPC ....... H04B 7/06968 (2023.05); H04L 5/0048 (2013.01)

(58) Field of Classification Search
CPC ... H04B 5/0053; H04L 5/0032; H04L 5/0048; H04L 5/0053; H04W 72/042; H04W 72/23; H04W 72/1278; H04W 72/1268
(Continued)

(56) References Cited

U.S. PATENT DOCUMENTS 10,986,622 B2    4/2021  Zhang et al.
12,369,173 B2 *  7/2025  Li ........................ H04W 72/535
(Continued)

FOREIGN PATENT DOCUMENTS

EP      3641461  A1    4/2020
EP      3657725  A1    5/2020
WO   2020/215107  A2   10/2020
WO   2021/022123  A1    2/2021
WO   2021/051392  A1    3/2021
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
(Continued)

*Primary Examiner* — Khai Tran
(74) *Attorney, Agent, or Firm* — Brake Hughes Bellermann LLP

(57) ABSTRACT

Various example embodiments relate to apparatuses and methods for inter-cell beam management. An apparatus may be configured to support a first control resource set and a second control resource set for a serving cell, receive a transmission configuration indicator state indication for the first control resource set for a cell other than the serving cell, and ignore, for the second control resource set, the received transmission configuration indicator state indication when the second control resource set is configured to follow a transmission configuration indicator state indication for the serving cell.

20 Claims, 7 Drawing Sheets

(58) Field of Classification Search
USPC ......................................... 375/267, 260, 299
See application file for complete search history.

(56) References Cited

U.S. PATENT DOCUMENTS

| | | | |
|---|---|---|---|
| 2019/0253308 A1 | 8/2019 | Huang et al. | |
| 2020/0221428 A1 | 7/2020 | Moon et al. | |
| 2020/0351129 A1 | 11/2020 | Kwak et al. | |
| 2021/0258936 A1 | 8/2021 | Takeda et al. | |
| 2021/0321406 A1 | 10/2021 | Sakhnini et al. | |
| 2021/0337584 A1* | 10/2021 | Zhang | H04W 72/23 |
| 2021/0352636 A1* | 11/2021 | Shao | H04L 1/1896 |
| 2023/0156845 A1* | 5/2023 | Khoshnevisan | H04W 76/19 |
| | | | 370/216 |
| 2023/0328557 A1* | 10/2023 | Bai | H04W 24/10 |
| | | | 370/252 |
| 2024/0267175 A1* | 8/2024 | Matsumura | H04L 5/0035 |
| 2024/0405957 A1* | 12/2024 | Deghel | H04B 7/0695 |

FOREIGN PATENT DOCUMENTS

| | | | |
|---|---|---|---|
| WO | 2021/214377 A1 | 10/2021 | |
| WO | 2021/234678 A2 | 11/2021 | |

OTHER PUBLICATIONS

"3rd Generation Partnership Project; Technical Specification Group Radio Access Network; NR; Physical layer procedures for control (Release 16)", 3GPP TS 38.213, V16.7.0, Sep. 2021, pp. 1-188.

"3rd Generation Partnership Project; Technical Specification Group Radio Access Network; NR; Physical layer procedures for data (Release 16)", 3GPP TS 38.214, V16.7.0, Sep. 2021, pp. 1-172.

Office action received for corresponding Finnish U.S. Appl. No. 20/225,006, dated Jun. 16, 2022, 12 pages.

International Search Report and Written Opinion received for corresponding Patent Cooperation Treaty Application No. PCT/EP2022/087753, dated Feb. 15, 2023, 19 pages.

"Feature lead summary#1 on Enhancements on Multi-TRP inter-cell operation", 3GPP TSG RAN WG1 #106bis-e, R1-2110482, Agenda: 8.1.2.2, vivo, Oct. 11-19, 2021, 29 pages.

"Enhancement on multi-beam operation", 3GPP TSG RAN WG1 #107-e, R1-2112276, Agenda: 8.1.1, MediaTek Inc., Nov. 11-19, 2021, 18 pages.

Office action received for corresponding Finnish Application No. 20225006, dated Apr. 5, 2023, 17 pages.

"Moderator summary#4 for multi-beam enhancement: Round 3", 3GPP TSG RAN WG1 #106-e, R1-2108399, Agenda: 8.1.1, Samsung, Aug. 16-27, 2021, 42 pages.

Communication pursuant to Article 94(3) EPC for European Patent Application No. 22839835.0, mailed on Oct. 6, 2025, 8 pages.

3GPP TSG RAN WG1 #106bis-e, R1-2110482; "Feature Lead Summary#1 on Enhancements on Multi-TRP Inter-Cell Operation"; Source: Moderator (VIVO); Agenda Item: 8.1.2.2; e-Meeting; Oct. 11-19, 2021; 29 pages.

3GPP TSG RAN WG1 #107-e; R1-2112276; "Enhancement on Multi-Beam Operation"; Agenda Item: 8.1.1; Source: MediaTek Inc.; e-Meeting; Nov. 11-19, 2021; 18 pages.

* cited by examiner

100
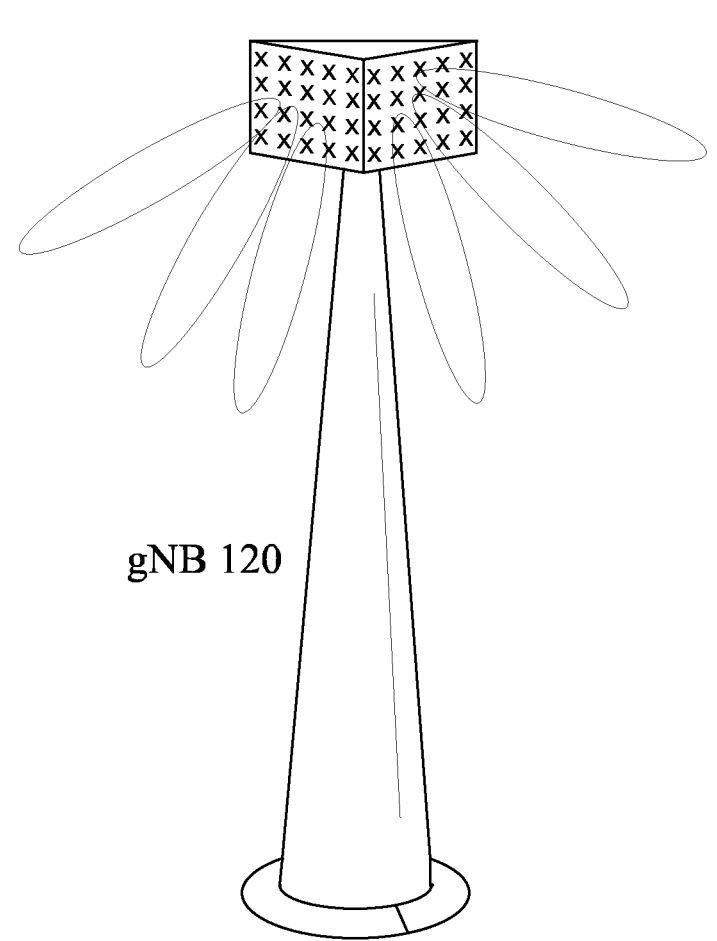
gNB 120
UE 110
FIG. 1

110

210. support a first CORESET and a second CORESET for a serving cell 220. receive a TCI state indication for the first CORESET for a cell other than the serving cell 230. apply the received TCI state indication to the first CORESET 240. ignore the TCI state indication for the second CORESET when it is configured to follow a TCI state indication for the serving cell 250. apply a TCI state previously indicated for the serving cell to the second CORESET 260. apply a default TCI state for the second CORESET 270. apply QCL source SSB of a previously indicated TCI state as QCL source RS for the second CORESET 280. monitor on the serving cell for a TCI state indication designated for the second CORESET

| 282. receive a TCI state indication designated for the second CORESET |
| :---: |
| 284. apply the received TCI state indication to one or more CORESETs of the same CORESET type as the second CORESET |

110

| 286. receive a TCI state indication designated for the second CORESET associated with CSS |
| :---: |
| 288. apply the received TCI state indication to the CSS part of one or more CORESETs |

110

310. receive a TCI state indication for a cell other than a serving cell 320. apply the indicated TCI state to USS of a first CORESET associated with USS and CSS 330. ignore the indicated TCI state for CSS of the first CORESET 340. assume a previously indicated TCI state for the serving cell for CSS of the first CORESET 350. assume a default TCI state for CSS of the first CORESET 360. assume a TCI state previously indicated for the first CORESET for CSS of the first CORESET 370. assume QCL source SSB in a previously indicated TCI state as QCL source RS for CSS of the first CORESET 380. monitor a TCI state indication indicated for the serving cell for CSS of the first CORESET

FIG. 6

110

| 410. receive a TCI state indication |
| --- |

| 420. apply the indicated TCI state to CSS of one or more CORESETs when it is provided for a serving cell and indicates QCL source SSB |
| --- |

| 430. apply the indicated TCI state to USS of one or more CORESETs when it is provided for a cell other than the serving cell and indicates QCL source RS other than SSB |
| --- |

| 440. apply the indicated TCI state to USS of one or more CORESETs when it is provided for the serving cell and indicates QCL source RS other than SSB |
| --- |

APPARATUS AND METHOD FOR INTER-CELL BEAM MANAGEMENT

RELATED APPLICATION

This application was originally filed as PCT Application No. PCT/EP2022/087753 on Dec. 23, 2022, which claims priority from Finnish Application No. 20225006, filed on Jan. 5, 2022, each of which is incorporated herein by reference in its entirety.

TECHNICAL FIELD

Various example embodiments described herein generally relate to communication technologies, and more particularly, to apparatuses and methods supporting inter-cell beam management.

BACKGROUND

In 5G New Radio (NR), further enhancement of multiple input multiple output (MIMO) includes support for inter-cell beam management. With inter-cell beam management, a user equipment (UE) can be configured to communicate with one or more additional cells with physical cell identities (PCIs) different from the serving cell, while the serving cell does not change.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of an apparatus is provided. The apparatus may comprise at least one processor and at least one memory including computer program code. The at least one memory and the computer program code may be configured to, with the at least one processor, cause the apparatus at least to support a first control resource set and a second control resource set for a serving cell, to receive a transmission configuration indicator state indication for the first control resource set for a cell other than the serving cell, and to ignore, for the second control resource set, the received transmission configuration indicator state indication when the second control resource set is configured to follow a transmission configuration indicator state indication for the serving cell.

In a second aspect, an example embodiment of an apparatus is provided. The apparatus may comprise at least one processor and at least one memory including computer program code. The at least one memory and the computer program code may be configured to, with the at least one processor, cause the apparatus at least to receive a transmission configuration indicator state indication for a cell other than a serving cell, to apply the transmission configuration indicator state indication to an apparatus-specific control resource set search space associated with a first control resource set configured for the apparatus, the first control resource set further being associated with a common control resource set search space, and to ignore the transmission configuration indicator state indication for the common control resource set search space associated with the first control resource set.

In a third aspect, an example embodiment of an apparatus is provided. The apparatus may comprise at least one processor and at least one memory including computer program code. The at least one memory and the computer program code may be configured to, with the at least one processor, cause the apparatus at least to receive a transmission configuration indicator state indication, to apply the transmission configuration indicator state indication to a common control resource set search space for one or more control resource sets configured for the apparatus when the transmission configuration indicator state indication is provided for a serving cell and indicates a synchronization signal block as a quasi-colocation source reference signal, and to apply the transmission configuration indicator state indication to an apparatus-specific control resource set search space for the one or more control resource sets configured for the apparatus when the transmission configuration indicator state indication is provided for a cell other than the serving cell and indicates a quasi-colocation source reference signal other than a synchronization signal block.

In a fourth aspect, an example embodiment of a method is provided. The method may comprise supporting at an apparatus a first control resource set and a second control resource set for a serving cell, receiving at the apparatus a transmission configuration indicator state indication for the first control resource set for a cell other than the serving cell, and ignoring, for the second control resource set, the received transmission configuration indicator state indication when the second control resource set is configured to follow a transmission configuration indicator state indication for the serving cell.

In a fifth aspect, an example embodiment of a method is provided. The method may comprise receiving at an apparatus a transmission configuration indicator state indication for a cell other than a serving cell, applying the transmission configuration indicator state indication to an apparatus-specific control resource set search space associated with a first control resource set configured for the apparatus, the first control resource set further being associated with a common control resource set search space, and ignoring the transmission configuration indicator state indication for the common control resource set search space associated with the first control resource set.

In a sixth aspect, an example embodiment of a method is provided. The method may comprise receiving at an apparatus a transmission configuration indicator state indication, applying the transmission configuration indicator state indication to a common control resource set search space for one or more control resource sets configured for the apparatus when the transmission configuration indicator state indication is provided for a serving cell and indicates a synchronization signal block as a quasi-colocation source reference signal, and applying the transmission configuration indicator state indication to an apparatus-specific control resource set search space for the one or more control resource sets configured for the apparatus when the transmission configuration indicator state indication is provided for a cell other than the serving cell and indicates a quasi-colocation source reference signal other than a synchronization signal block.

In a seventh aspect, an example embodiment of an apparatus is provided. The apparatus may comprise means for performing a method according to any one of the fourth to sixth aspects mentioned above.

In an eighth aspect, an example embodiment of a computer program product is provided. The computer program product may be embodied in at least one non-transitory computer readable medium and comprise program instructions for causing an apparatus to perform a method according to any one of the fourth to sixth aspects mentioned above.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

FIG. 1 is a schematic diagram illustrating a cellular communication network in which example embodiments of the present disclosure can be implemented.

FIG. 3 is a flowchart illustrating a method for inter-cell beam management according to an example embodiment.

FIG. 6 is a flowchart illustrating a method for inter-cell beam management according to an example embodiment.

FIG. 7 is a flowchart illustrating a method for inter-cell beam management according to an example embodiment.

Throughout the drawings, same or similar reference numbers indicate same or similar elements. A repetitive description on the same elements would be omitted.

DETAILED DESCRIPTION

Figure 2A:
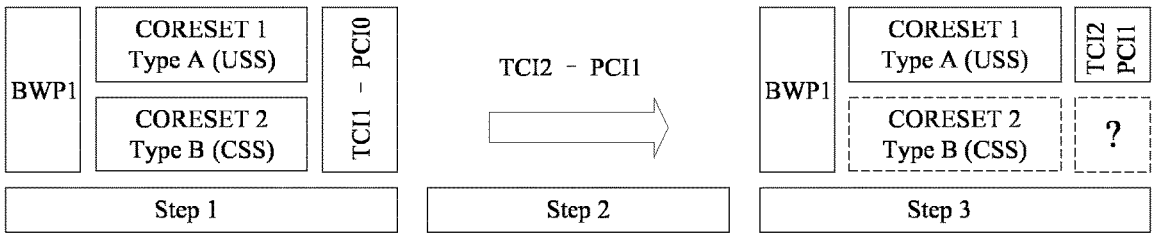
FIG. 2A is a schematic diagram illustrating a scenario in inter-cell beam management.

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, a D2D communication device, a V2X communication device, a sensor and the like. The term "terminal device" can be used interchangeably with UE, a user terminal, a mobile terminal, a mobile station, or a wireless device.

FIG. 1 illustrates a schematic diagram of a cellular communication network 100 in which example embodiments of the present disclosure can be implemented. Referring to FIG. 1, the cellular communication network 100, which may be a part of a larger network or system, may include a base station 120 shown as gNB and one or more user equipments (UEs) 110 (only one is shown) in communication with the base station 120. The base station 120 may include one or more antenna panels in which a number of antenna elements are arranged in an array. For massive multiple input multiple output (MIMO), the antenna panel may include hundreds of antenna elements. The base station 120 can adjust amplitudes and phase shifts of transmit signals provided to the antenna elements so that signals radiated from the antenna array coherently combine together for a particular transmit direction and destructively cancel each other out for other directions, forming an aggregate transmit signal exhibiting beam-like qualities with more power propagating in the particular direction. This is the so-called beamforming. Beamforming can increase cell coverage and it is suitable especially for the millimeter wave frequency range (FR2) which suffers from a high path loss. The base station 120 can support one or more (e.g., two, three, four, five and the like) cells, including for example a macro cell or a small cell, such as a pico cell or a femto cell, and/or other types of cells. The term "cell" used herein may refer to a particular geographic coverage area served by the base station 120 and/or a subsystem of the base station 120 serving the coverage area, depending on the context in which the term is used. When the description herein indicates that the "cell" performs functions, it would be appreciated that the base station 120 serving the cell would perform the functions.

In some examples, the network 100 may employ a multiple transmission reception point (mTRP) architecture in order to improve reliability, coverage, and capacity performance through flexible deployment scenarios. A transmission reception point (TRP) may be implemented as for example a macro cell, a small cell, a pico cell, a femto cell, a remote radio head (RRH), a relay node or the like. The UE 110 can transmit to and receive from plural TRPs where the plural TRPs may be controlled by or associated with one or more base stations 120. Example embodiments described herein are not limited to a particular deployment of the TRPs or a particular relationship between the TRPs and the base stations. In some example embodiments, the mTRP operation may be performed by a base station, such as the base station 120, having multiple antenna panels or radio heads corresponding to the TRPs and multiple radio frequency units operating with the respective antennas.

In 3GPP Rel. 17, further enhancement on multiple input multiple output (MIMO) includes support for inter-cell beam management. With inter-cell beam management, the UE 110 can be configured to communicate with one or more additional cells with physical cell identities (PCIs) different from the serving cell, and the serving cell may not change when beam selection (e.g. beam indication) is done. This operation may be also referred sometimes as dynamic point selection (DPS) involving multiple PCIs. The beam indication may be based on Rel. 17 unified TCI (transmission configuration indicator) framework which provisions MAC-CE (medium access control-control element) based beam indication and DCI (downlink control information) based beam indication. The UE 110 may receive via MAC CE or DCI a TCI state indication (i.e., beam indication) containing information of a quasi-colocation (QCL) source reference signal (RS) and apply the indicated TCI state to one or more control resource sets (CORESETs) for monitoring a control channel such as a physical downlink control channel (PDCCH) on a beam. The UE 110 may be configured and indicated to receive UE-specific/dedicated channels from the one or more additional cells with different PCIs than the serving cell, and common channels are monitored on the serving cell. In some cases the receiving on UE-specific/dedicated channels may refer to at least monitoring of downlink control information on user specific search space configured for a CORESET. In some cases, receiving common channels may refer to at least monitoring downlink control information on common search space configured for a CORESET.

There may be at least three types of CORESETs: Type A associated with a UE-specific search space (USS), CORESET Type B associated with a common search space (CSS), and CORESET Type C associated with both USS and CSS. It has been agreed that the CORESET Type B can be configured to follow a beam indication for the serving cell based on radio resource control (RRC) configuration since the CSS may not be monitored on a cell with a different PCI than the serving cell. These CORESETs may be, in addition to CORESET #0. Alternatively or additionally, a CORESET configured with CSS (e.g. Type B or Type C) may have configuration of searchspacezero (a common search space typically configured for initial bandwidth on CORESET #0 but may be configured on at least one CORESET on at least one other bandwidth part than initial bandwidth part). The UE 110 may be configured with one or more (e.g., two, three and the like) CORESETs of the same or different types. In some particular cases, however, it is still not clear how the UE 110 determines the TCI state/QCL assumption for the CSS monitoring on the serving cell e.g. in scenarios such as inter-cell beam management.

Figure 2B:
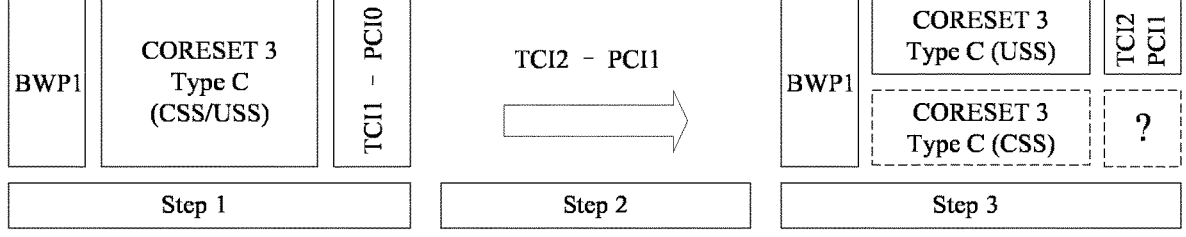
FIG. 2B is a schematic diagram illustrating another scenario in inter-cell beam management.

FIG. 2A and FIG. 2B each shows an example scenario where there is an ambiguity of TCI state/QCL assumption for the UE 110. Referring to FIG. 2A, at a first step, the UE 110 may operate in a bandwidth part BWP1 and be configured with a first CORESET 1 of Type A associated with a UE-specific search space (USS) and a second CORESET 2 of Type B associated with a common search space (CSS). Both the first CORESET 1 and the second CORESET 2 have the same TCI state TCI1 indicated for the serving cell with a physical cell identity PCI0 since the second CORESET 2 is configured via RRC to follow the serving cell beam indication. At a second step, the UE 110 may receive a new TCI state indication TCI2 for the first CORESET 1 and the new TCI state indicates a QCL source RS from a cell with a physical cell identity PCI1 that is different from the physical cell identity PCI0 of the serving cell. The UE 110 may apply the indicated TCI state TCI2 to the first CORESET 1 at a third step but for the second CORESET 2 the TCI state is not determined after the new TCI state indication because the CSS associated with the second CORESET cannot be monitored on the cell PCI1 other than the serving cell PCI0. The UE 110 needs to regularly monitor the CSS e.g. for reception of short messages such as paging DCI that indicates system information change or ETWS (Earthquake and Tsunami Warning System) waring, but the QCL assumption for PDCCH reception scheduled on the CSS is not determined after the new TCI state indication in this case.

In some examples, the UE 110 may support only one TCI state. This one TCI state may refer to one active or one indicated TCI state. In some examples UE 110 may support one (active) TCI state per bandwidth part or one (active) TCI state per cell (e.g. serving cell and cell with different PCI than the serving cell) or one TCI across all the cells (e.g. serving cell and cell with different PCI). It means that the UE 110 can be configured with multiple CORESETs but only one TCI state can be activated at a time. In the example scenario shown in FIG. 2A, the new TCI state TCI2 may be activated for the first CORESET 1 in the third step, but when the UE 110 needs to switch PDCCH reception on the USS of the cell PCI1 to PDCCH reception on the CSS of the serving cell PCI0, the TCI state/QCL assumption is not clear.

FIG. 2B shows another example scenario where the UE 110 is configured with a CORESET (e.g. with an identifier "3") (that may be referred herein as of Type C CORESET) associated with a common search space (CSS) and a UE-specific search space (USS). Similar to the example scenario shown in FIG. 2A, the UE 110 may apply the indicated TCI state TCI2 to the USS associated with the CORESET 3 at the third step but for the CSS associated with the CORESET 3 the TCI state is not determined after the new TCI state indication because the CSS cannot be monitored on the cell PCI1 other than the serving cell PCI0. When there is an ambiguity of TCI state/QCL assumption, the UE 110 may not be able to determine a proper assumption for Layer 1 reference signal received power (L1-RSRP) measurements e.g. in case of time domain conflict between RSRP measurement and control channel monitoring. For example, the UE 110 cannot determine which reference signal overlaps (e.g. it should consider to be overlapping) with the PDCCH reception scheduled on the CSS of the serving cell and RSRP measurement.

Hereinafter, various example embodiments of methods and apparatuses supporting inter-cell beam management will be described in detail with reference to the accompanying drawings. In the example embodiments, the ambiguity of TCI state/QCL assumption for the CSS monitoring on the serving cell can be removed when the UE receives a beam indication for a cell other than the serving cell, while the signaling overhead would not be increased significantly. It would be appreciated that the example embodiments described herein may also be used in the mTRP architecture.

Now turning to FIG. 3, illustrated is an example method for inter-beam management according to an example embodiment. The method can be performed by a UE such as the UE 110 described above with reference to FIG. 1. In some example embodiments, the UE 110 may include a plurality of means, modules or elements implemented to perform operations discussed below with respect to the method shown in FIG. 3. The means, modules and elements may be implemented in various manners including but not limited to for example software, hardware, firmware or any combination thereof to perform the operations.

Referring to FIG. 3, at a step 310, the UE 110 may be configured to support a first control resource set (CORESET) and a second CORESET for a serving cell. In other words, the network activates the first CORESET and the second CORESET for the UE 110 to communicate with the serving cell. In some example embodiment, the first CORESET may be of a first CORESET type such as Type A associated with a UE-specific search space (USS), and the second CORESET may be of a second CORESET type such as Type B associated with a common search space (CSS). The second CORESET may be configured to follow a beam indication for the serving cell because the CSS can be monitored only on the serving cell. In one further example, the second CORESET (or e.g. at least one CORESET associated with at least CSS) may be configured to follow a beam indication (e.g. TCI state indication/DCI based TCI state indication) for the serving cell and not to follow the beam indication when the indicated TCI state indicates RS associated with a different PCI than serving cell.

At a step 220, the UE 110 may receive from the network a TCI state indication for the first CORESET for a cell other than the serving cell. For example, the TCI state indication may be received via MAC CE or DCI from the base station 120 as shown in FIG. 1, and it may include for example a cell identity, a CORESET identity and a TCI state identity. The indicated TCI state may contain quasi-colocation (QCL) information which may include one or more (e.g. two) pairs of QCL source reference signal (RS) and QCL type. The QCL source RS may include for example SSB (synchronization signal block), CSI-RS (channel state information—reference signal), TRS (tracking reference signal) and the like. In the step 220, it is assumed that the received TCI state indication is for the first CORESET and for a cell with a physical cell identity (PCI) different from the serving cell of the UE 110.

At a step 230, the UE 110 may apply the received TCI state indication to the first CORESET. Then the UE 110 can monitor the first CORESET in the USS associated with the first CORESET using the QCL information indicated in the applied TCI state for PDCCH reception on the cell other than the serving cell.

At a step 240, the UE 110 may ignore the received TCI state indication for the second CORESET since the second CORESET is configured to follow a TCI state indication for the serving cell and the CSS associated with the second CORESET cannot be monitored on the cell other than the serving cell. At this point of time, the UE 110 may (temporarily) assume that the second CORESET does not follow the beam indication.

In some example embodiments, the UE 110 may optionally apply a TCI state previously indicated for the serving cell to the second CORESET at a step 250. For example, the UE 110 may check its TCI state list and determine the last/latest TCI state which indicates a QCL source RS from the serving cell. Then the UE 110 may apply the determined TCI state to the second CORESET. In some example embodiments, the last/latest TCI state for the serving cell determined at the UE 110 may be the TCI state applied to the second CORESET before the UE 110 receives the TCI state indication for the cell other than the serving cell at the step 220. In other words, the TCI state applied to the second CORESET may remain unchanged until the UE 110 receives a new TCI state indication for the serving cell.

At a step 260, optionally, the UE 110 may apply a default TCI state for the second CORESET. The default TCI state may be selected from a list of TCI states configured and/or activated for the UE 110. The default TCI state may have a specific (e.g. the lowest or the largest) TCI state index (i.e. identity) and it is indicated for the serving cell. In some example embodiments, the network and the UE 110 have common understanding on selection of the default TCI state and when a configured but not yet activated TCI state is selected as the default TCI state to be applied to the second CORESET, the network would activate the default TCI state for the UE 110.

As another option, at a step 270, the UE 110 may apply a QCL source SSB previously indicated in a TCI state as the QCL source RS for the CSS monitoring on one or more CORESETs associated with CSS (including the second CORESET). For example, the UE 110 may apply the last/latest TCI state including the QCL source SSB to one or more CORESETs of Type B. In some example embodiments, the UE 110 may also apply the last/latest TCI state including the QCL source SSB to the CSS associated with one or more CORESETs associated with CSS (e.g. a CORESET of type C).

In some example embodiments, when the UE 110 receives the TCI state for the first CORESET for the cell other than the serving cell at the step 220, in addition to performing any one of the above steps 250-270, the UE 110 may also assume that a separate TCI state indication would be provided for the second CORESET. Then at a step 280, the UE 110 may monitor on the serving cell for a TCI state indication designated to the second CORESET. For example, the UE 110 may monitor for a CORESET specific TCI state indication such as a TCI state indication MAC CE which refers to the identity of the second CORESET. When the CORESET specific TCI state indication is received, the UE 110 would apply it to the second CORESET.

In some example embodiments, the UE 110 may receive again a new TCI state indication for the first CORESET. If the received TCI state indication includes a QCL source RS from the serving cell, the UE 110 may apply it to both the first CORESET and the second CORESET. In other words, the second CORESET follows the beam indication (again) once/when the beam indication is indicated for the serving cell.

Figure 4:
FIG. 4 is a flowchart illustrating a method for inter-cell beam management according to an example embodiment.
Figure 5:
FIG. 5 is a flowchart illustrating a method for inter-cell beam management according to an example embodiment.

Now turning to FIG. 4, illustrated is an example of operations where a TCI state indication designated to the second CORESET is received at the UE 110. At a step 282, the UE 110 may receive a TCI state indication for the second CORESET. The received TCI state indication may refer to the identity of the second CORESET and the indicated TCI state may have a QCL source RS from the serving cell. At a step 284, the UE 110 may apply the received TCI state indication to the second CORESET and to one or more additional CORESETs of the same CORESET type as the second CORESET. In other words, the UE 110 may apply the received TCI state indication which is designated for the second CORESET to all CORESETs of the same CORESET type as the second CORESET, but does not apply the received TCI state indication to other CORESET types. Alternatively, or in other words, the UE 110 may apply the received TCI state indication which is designated for the second CORESET to all CORESETs associated with CSS (e.g. in case of CORESET with USS and CSS, apply to the CSS part only). FIG. 5 illustrates another example of operations where a TCI state indication for the second CORESET is received at the UE 110. At a step 286, the UE 110 may receive a TCI state indication designated to the second CORESET for example by referring to the identity of the second CORESET. As discussed above, the second CORESET is associated with a common search space (CSS). The received TCI state indication may have a QCL source RS from the serving cell. At a step 288, the UE 110 may apply the received TCI state indication to the CSS part of one or more CORESETs including the second CORESET. For example, if the UE 110 is further configured with a third CORESET of Type C associated with both CSS and USS, the UE 110 may apply the received TCI state indication to the second CORESET and to the CSS part of the third CORESET. The UE 110 would not apply the received TCI state indication to the USS part of a CORESET.

In the method discussed above with respect to FIGS. 3-5, the ambiguity of TCI state/QCL assumption for the UE 110 may be removed by applying a previous or default TCI state for the CSS monitoring on one or more CORESETs associated with CSS when the beam indication for a cell other than the serving cell is received at the UE 110, and the method does not cause significant increasing of signaling overhead. The CORESETs associated with CSS may follow the beam indication again when a beam indication for the serving cell is received at the UE 110.

FIG. 6 illustrates another example method for inter-beam management according to an example embodiment. The method can be performed by a UE such as the UE 110 described above with reference to FIG. 1. In some example embodiments, the UE 110 may include a plurality of means, modules or elements implemented to perform operations discussed below with respect to the method shown in FIG. 6. The means, modules and elements may be implemented in various manners including but not limited to for example software, hardware, firmware or any combination thereof to perform the operations.

At the beginning of the method, it may be assumed that the UE 110 is configured with at least a first control resource set (CORESET) of Type C that is associated with a UE-specific search space (USS) and a common search space (CSS). The UE 110 may also be configured with one or more additional CORESETs of Type A or Type B.

In the example embodiments herein, applying a TCI state to a CSS part of the CORESET may refer that UE monitors CSS (one or more CSS of the CORESET) for downlink control information. As an example, if UE is configured with CORESET associated with specific SS type (search space type) and it is said that TCI state applies for specific SS (e.g. CSS) it may mean that SS is monitored for downlink control information according to the TCI state (according to the RS(s) indicated by the TCI state). As an example, if a CORESET is configured with both CSS and USS and in some embodiments the TCI state is said to apply for the CSS, it may refer to a monitoring of CSS of the CORESET according to the TCI state by the UE 110. As another example if a CORESET is configured with both CSS and USS and in some embodiments the TCI state is said to apply for the USS, it may refer to a monitoring of USS of the CORESET according to the TCI state by the UE 110. As a yet another example if multiple CORESETs are configured e.g. one with both CSS and USS and one with CSS and in some embodiments the TCI state is said to apply for the CSS monitoring, it may refer to a monitoring of CSS/CSS part of the CORESETs according to the TCI state by the UE 110.

At a step 310, the UE 110 may receive from the network a TCI state indication for a cell other than the serving cell of the UE 110. For example, the TCI state indication may be received via MAC CE or DCI from the base station 120 as shown in FIG. 1, and it may include for example a physical cell identity (PCI) of the cell other than the serving cell. The TCI state indication may also include for example a CORESET identity and a TCI state identity. The CORESET identity may be the identity of the first CORESET configured for the UE 110. The indicated TCI state may specify a QCL source RS which may include for example CSI-RS (channel state information-reference signal), TRS (tracking reference signal) and the like.

At a step 320, the UE 110 may apply the received TCI state indication to the USS associated with the first CORESET. Then the UE 110 can monitor the first CORESET in the USS associated with the first CORESET using the QCL information indicated in the applied TCI state for PDCCH reception on the cell other than the serving cell.

At a step 330, the UE 110 may ignore the received TCI state indication for the CSS associated with the first CORESET since the CSS cannot be monitored on the cell other than the serving cell. At this point of time, the UE 110 may (temporarily) assume that the CSS part of the first CORESET does not follow the beam indication.

In some example embodiments, the UE 110 may optionally apply a TCI state previously indicated for the serving cell to the CSS associated with the first CORESET at a step 340. For example, the UE 110 may check its TCI state list and determine the last/latest TCI state which indicates a QCL source RS from the serving cell. In some example embodiments, the last/latest TCI state for the serving cell determined at the UE 110 may be indicated for the first CORESET or for another CORESET different from the first CORESET. Then the UE 110 may apply the determined TCI state to the CSS associated with the first CORESET.

At a step 350, optionally, the UE 110 may apply a default TCI state for the CSS associated with the first CORESET. The default TCI state may be selected from a list of TCI states configured and/or activated for the UE 110. The default TCI state may have a specific (e.g. the lowest or the largest) TCI state index (i.e. identity) and it is indicated for the serving cell. In some example embodiments, the network and the UE 110 have common understanding on selection of the default TCI state for the CSS associated with the first CORESET and when a configured but not yet activated TCI state is selected as the default TCI state, the network would activate the default TCI state for the UE 110.

As another option, at a step 360, the UE 110 may apply a QCL source SSB (e.g. the SSB that is the QCL source RS with QCL type D (spatial rx)) previously indicated in a TCI state as the QCL source RS for the CSS associated with the first CORESET. In some example embodiments, the UE 110 may apply the last/latest TCI state including the QCL source SSB to one or more CORESETs associated at least partially with the CSS.

As another option, at a step 370, the UE 110 may apply a TCI state previously indicated for the serving cell for the first CORESET to the CSS of the first CORESET. In some example embodiments, the TCI state previously indicated for the serving cell may be the latest TCI state applied to the CSS associated with the first CORESET before the UE 110 receives the TCI state indication for the cell other than the serving cell at the step 310. In other words, the TCI state applied to the CSS associated with the first CORESET may remain unchanged until the UE 110 receives a new TCI state indication for the serving cell.

In some example embodiments, when the UE 110 receives the TCI state for the cell other than the serving cell at the step 310, in addition to performing any one of the above steps 340-370, the UE 110 may also assume that a separate TCI state indication for the serving cell would be provided for the CSS of the first CORESET. Then at a step 380, the UE 110 may monitor on the serving cell for a TCI state indication designated for the serving cell for the first CORESET. For example, the UE 110 may monitor for a CORESET specific TCI state indication such as a TCI state indication MAC CE which refers to the identity of the first CORESET and designate a QCL source RS from the serving cell. When the CORESET specific TCI state indication is received, the UE 110 would apply it to the CSS associated with the first CORESET.

FIG. 7 illustrates another example method for inter-beam management according to an example embodiment. The method can be performed by a UE such as the UE 110 described above with reference to FIG. 1. In some example embodiments, the UE 110 may include a plurality of means, modules or elements implemented to perform operations discussed below with respect to the method shown in FIG. 7. The means, modules and elements may be implemented in various manners including but not limited to for example software, hardware, firmware or any combination thereof to perform the operations.

Unlike the methods discussed above with respect to FIGS. 3-6 where the UE 110 can support more than one active TCI states, in the method shown in FIG. 7 it is assumed that the UE 110 can support only one active TCI state. It means that the UE 110 can be configured with multiple CORESETs associated with USS and/or CSS, but only one TCI state can be activated at a time for one or more of the multiple CORESETs.

Referring to FIG. 7, at a step 410, the UE 110 may receive a TCI state indication from the network. As discussed above, the received TCI state indication may be indicated for the serving cell or a cell other than the serving cell, and it may include a QCL source RS such as SSB, CSI-RS, TRS or the like.

If the TCI state indication received at the step 410 is designated for the serving cell and it directly indicates SSB as the QCL source RS, the UE 110 may apply at a step 420 the received TCI state indication to one or more of the CORESETs configured for the UE 110 for monitoring the CSS on the serving cell. In some example embodiments, the step 420 may be applied to the CSS that has a specific search space identity for example the search space identity zero. In some example embodiments, the step 420 may be applied to the CORESETs that have the CSS monitoring on the serving cell.

If the TCI state indication received at the step 410 is designated for a cell other than the serving cell and it indicates a reference signal other than SSB, such as CSI-RS and TRS, as the QCL source RS, the UE 110 may apply at a step 430 the received TCI state indication to one or more of the CORESETs configured for the UE 110 for monitoring the USS on the cell other than the serving cell. In other words, the UE 110 may apply the received TCI state indication to one or more CORESETs associated at least partially with the USS.

If the TCI state indication received at the step 410 is designated for the serving cell and it indicates a reference signal other than SSB, such as CSI-RS and TRS, as the QCL source RS, the UE 110 may apply at a step 440 the received TCI state indication to one or more of the CORESETs configured for the UE 110 for monitoring the USS on the serving cell. In other words, the UE 110 may apply the received TCI state indication to one or more CORESETs associated at least partially with the USS.

In some example embodiments, the TCI state indication received at the step 410 may have a predetermined QCL type e.g. the QCL type D.

In some example embodiments, the beam indication (i.e., the TCI state indication) received from the network may be a joint beam indication for both downlink channels and uplink channels or a separate beam indication for either downlink channels or uplink channels. The CSS monitoring mentioned above will follow the separate UL TCI state if the separate beam indication is provided or follow the applied TCI state if the joint beam indication is provided.

Figure 8:
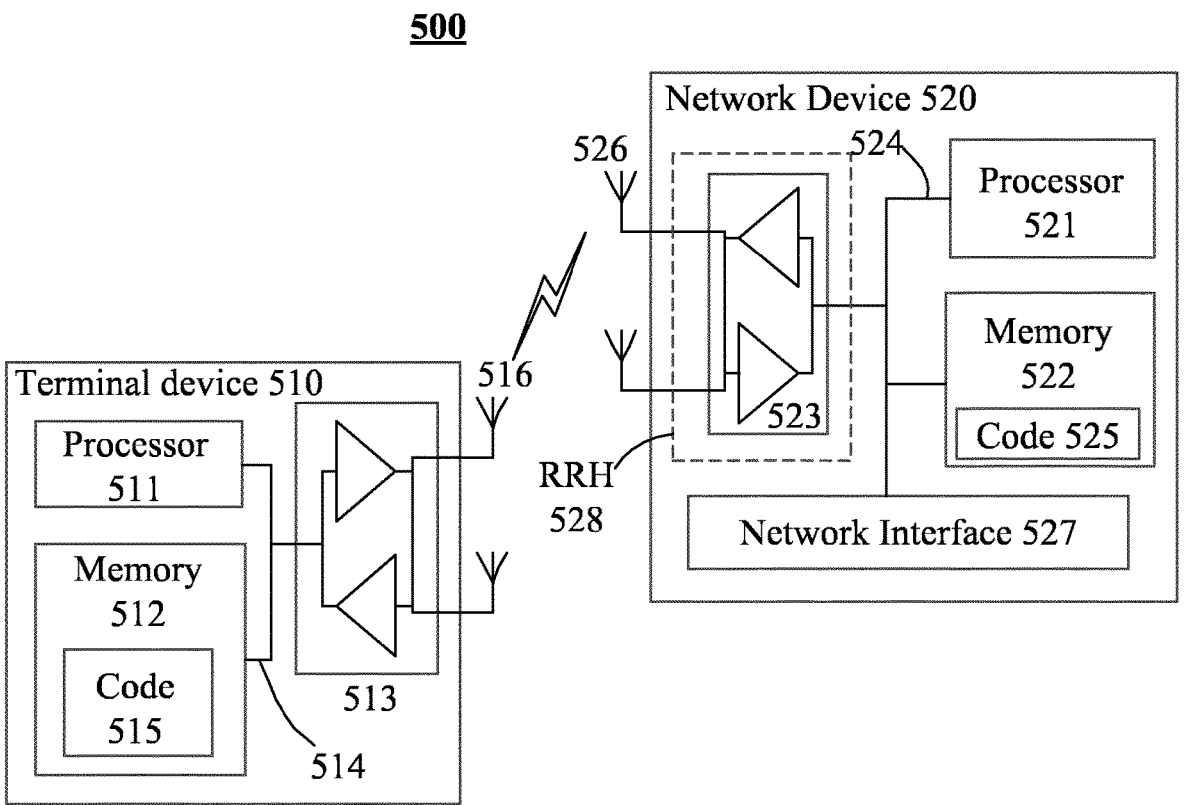
FIG. 8 is a structure block diagram illustrating devices in a communication system in which example embodiments of the present disclosure can be implemented.

FIG. 8 is a schematic block diagram illustrating devices in a communication system 500 for implementing one or more example embodiments. As shown in FIG. 8, the communication system 500 may comprise a terminal device 510 which may be implemented as the UE 110 discussed above and a network device 520 which may be implemented as the base station 120 discussed above.

Referring to FIG. 8, the terminal device 510 may comprise one or more processors 511, one or more memories 512 and one or more transceivers 513 interconnected through one or more buses 514. The one or more buses 514 may be address, data, or control buses, and may include any interconnection mechanism such as series of lines on a motherboard or integrated circuit, fiber, optics or other optical communication equipment, and the like. Each of the one or more transceivers 513 may comprise a receiver and a transmitter, which are connected to one or more antennas 516. The terminal device 510 may wirelessly communicate with the network device 520 through the one or more antennas 516. The one or more memories 512 may include computer program code 515. The one or more memories 512 and the computer program code 515 may be configured to, when executed by the one or more processors 511, cause the terminal device 510 to perform processes and steps relating to the UE 110 as described above.

The network device 520 may comprise one or more processors 521, one or more memories 522, one or more transceivers 523 and one or more network interfaces 527 interconnected through one or more buses 524. The one or more buses 524 may be address, data, or control buses, and may include any interconnection mechanism such as a series of lines on a motherboard or integrated circuit, fiber, optics or other optical communication equipment, and the like. Each of the one or more transceivers 523 may comprise a receiver and a transmitter, which are connected to one or more antennas 526. The network device 520 may wirelessly communicate with the terminal device 510 through the one or more antennas 526. The one or more transceivers 523 and the one or more antennas 526 may be implemented as one or more remote radio heads (RRHs) 528. The one or more RRHs 528 may be collocated or located at different positions. The one or more buses 524 could be implemented in part as fiber optic cable to connect the RRHs 528 to other components of the network device 520. The one or more network interfaces 527 may provide wired or wireless communication links through which the network device 520 may communicate with other network devices, entities, elements or functions. The one or more memories 522 may include computer program code 525. The one or more memories 522 and the computer program code 525 may be configured to, when executed by the one or more processors 521, cause the network device 520 to perform processes and steps relating to the base station 120 as described above.

The one or more processors 511, 521 and 531 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 511, 521 and 531 may be configured to control other elements of the UE/network device/network element and operate in cooperation with them to implement the procedures discussed above.

The one or more memories 512, 522 and 532 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 512, 522 and 532 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The abbreviations that may be found in the specification and/or the drawings are defined as follows:

CORESET Control Resource Set
CSI-RS Chanel State Information-Reference Signal
CSS Common Search Space
DCI Downlink Control Information
MAC-CE Medium Access Control-Control Element
MIMO Multiple Input Multiple Output
mTRP multiple Transmission Reception Point
NR New Radio
PCI Physical Cell Identity
PDCCH Physical Downlink Control Channel
QCL Quasi-CoLocation
RRC Radio Resource Control
RS Reference Signal
SSB Synchronization Signal Block
TRS Tracking Reference Signal
TCI Transmission Configuration Indicator
UE User Equipment
USS UE-specific Search Space

The invention claimed is:

1. An apparatus comprising at least one processor; and at least one memory including computer program code, the at least one memory and the computer program code being configured to, with the at least one processor, cause the apparatus at least to:

support a first control resource set of a first control resource set type and a second control resource set of a second control resource set type for a serving cell;

receive a transmission configuration indicator state indication for the first control resource set for a cell other than the serving cell; and ignore, for the second control resource set, the received transmission configuration indicator state indication when the second control resource set of the second control resource set type is configured to follow a transmission configuration indicator state indication for the serving cell.

2. The apparatus of claim 1, wherein the at least one memory and the computer program code are further configured to, with the at least one processor, cause the apparatus at least to:

apply a previously indicated transmission configuration indicator state for the serving cell for the second control resource set.

3. The apparatus of claim 1, wherein the at least one memory and the computer program code are further configured to, with the at least one processor, cause the apparatus at least to:

apply a synchronization signal block that is a quasi-colocation source reference signal of a previously indicated transmission configuration indicator state as the quasi-colocation source reference signal for the second control resource set.

4. The apparatus of claim 1, wherein the at least one memory and the computer program code are further configured to, with the at least one processor, cause the apparatus at least to:

apply a default transmission configuration indicator state for the second control resource set, the default transmission configuration indicator state being selected from one or more transmission configuration indicator states for the serving cell configured and/or activated for the apparatus.

5. The apparatus of claim 1, wherein the at least one memory and the computer program code are further configured to, with the at least one processor, cause the apparatus at least to:

monitor on the serving cell for a transmission configuration indicator state indication designated for the second control resource set.

6. The apparatus of claim 1, wherein the at least one memory and the computer program code are further configured to, with the at least one processor, cause the apparatus at least to:

receive a transmission configuration indicator state indication for the second control resource set; and apply the received transmission configuration indicator state indication for the second control resource set to one or more control resource sets of the second control resource set type including the second control resource set.

7. The apparatus of claim 1, wherein the at least one memory and the computer program code are further configured to, with the at least one processor, cause the apparatus at least to:

receive a transmission configuration indicator state indication for the second control resource set, the second control resource set being associated with a common control resource set search space; and apply the received transmission configuration indicator state indication for the second control resource set to the common control resource set search space for one or more control resource sets including the second control resource set.

8. The apparatus of claim 1, wherein a type of the first control resource set of the first control resource set type is associated with an apparatus-specific control resource set search space, and a type of the second control resource set of the second control resource set type is associated with a common control resource set search space.

9. A method comprising, by a terminal device:

supporting a first control resource set of a first control resource set type and a second control resource set of a second control resource set type for a serving cell;

receiving a transmission configuration indicator state indication for the first control resource set for a cell other than the serving cell; and ignoring, for the second control resource set, the received transmission configuration indicator state indication when the second control resource set of the second control resource set type is configured to follow a transmission configuration indicator state indication for the serving cell.

10. The method of claim 9, further comprising, by the terminal device:

applying a previously indicated transmission configuration indicator state for the serving cell for the second control resource set.

11. The method of claim 9, further comprising, by the terminal device:

applying a synchronization signal block that is a quasi-colocation source reference signal of a previously indicated transmission configuration indicator state as the quasi-colocation source reference signal for the second control resource set.

12. The method of claim 9, further comprising, by the terminal device:

applying a default transmission configuration indicator state for the second control resource set, the default transmission configuration indicator state being selected from one or more transmission configuration indicator states for the serving cell configured and/or activated for the terminal device.

13. The method of claim 9, further comprising, by the terminal device:

monitoring on the serving cell for a transmission configuration indicator state indication designated for the second control resource set.

14. The method of claim 9, further comprising, by the terminal device:

receiving a transmission configuration indicator state indication for the second control resource set; and applying the received transmission configuration indicator state indication for the second control resource set to one or more control resource sets of the second control resource set type including the second control resource set.

15. The method of claim 9, further comprising, by the terminal device:

receiving a transmission configuration indicator state indication for the second control resource set, the second control resource set being associated with a common control resource set search space; and applying the received transmission configuration indicator state indication for the second control resource set to the common control resource set search space for one or more control resource sets including the second control resource set.

16. The method of claim 9, wherein the first control resource set of the first control resource set type is associated with an apparatus-specific control resource set search space, and the second control resource set of the second control resource set type is associated with a common control resource set search space.

17. A non-transitory computer readable medium comprising program instructions that, when executed by an apparatus, cause the apparatus to perform at least the following:

supporting at an apparatus a first control resource set of a first control resource set type and a second control resource set of a second control resource set type for a serving cell;

receiving, at the apparatus, a transmission configuration indicator state indication for the first control resource set for a cell other than the serving cell; and ignoring, for the second control resource set, the received transmission configuration indicator state indication when the second control resource set of the second control resource set type is configured to follow a transmission configuration indicator state indication for the serving cell.

18. The non-transitory computer readable medium of claim 17, wherein the program instructions, when executed by an apparatus, further cause the apparatus at least to:

apply a previously indicated transmission configuration indicator state for the serving cell for the second control resource set.

19. The non-transitory computer readable medium of claim 17, wherein the program instructions, when executed by an apparatus, further cause the apparatus at least to:

apply a synchronization signal block that is a quasi-colocation source reference signal of a previously indicated transmission configuration indicator state as the quasi-colocation source reference signal for the second control resource set.

20. The non-transitory computer readable medium of claim 17, wherein the program instructions, when executed by an apparatus, further cause the apparatus at least to:

apply a default transmission configuration indicator state for the second control resource set, the default transmission configuration indicator state being selected from one or more transmission configuration indicator states for the serving cell configured and/or activated for the apparatus.

* * * * *